United States Patent Office 2,826,559
Patented Mar. 11, 1958

2,826,559

CURED RESINOUS COMPOSITIONS OF PHENOL, MELAMINE, AND FORMALDEHYDE AND PROCESS OF PREPARING SAME

Ivor H. Updegraff, Stamford, and Nicholas R. Segro, Fairfield, Conn., assignors to American Cyanamid Company, New York, N. Y., a corporation of Maine No Drawing. Application June 2, 1954
Serial No. 434,086

11 Claims. (Cl. 260—38)

This invention relates to resinous compositions comprising melamine, phenol and formaldehyde. Further this invention relates to the production of the resinous compositions whereby a definite process is followed. More particularly this invention relates to the resinous compositions, their method of production and articles produced therefrom.

The preparation of general purpose phenol-formaldehyde resinous compositions is well known. Certain of these compositions mold easily to an infusible and insoluble state in the presence of a hardening agent such as hexamethylenetetramine. The phenolformaldehyde resinous compositions that cure in the presence of a hardening agent are classified as a two-stage resin. Condensation products prepared from melamine and formaldehyde are also well known. These resinous compositions do not require the presence of a hardening agent in order to obtain a cured product. Advantages of resinous compositions which contain both melamine and phenol groups are desirable in order to obtain inherent advantages possessed by each general class of compounds. However, prior to our invention the only known resinous compositions prepared from melamine, phenol and formaldehyde were one-stage resins that did not require the presence of a hardening agent during the cure of the resin to an infusible and insoluble state. We have now found that a resinous composition may be prepared from melamine, phenol and formaldehyde which may be classified as a two-stage resin and which requires the presence of a hardening agent during cure in order to obtain the infusible and insoluble state.

It is an object of our invention to prepare a resinous composition from melamine, phenol and formaldehyde. It is a further object of our invention to prepare a resinous composition from melamine phenol and formaldehyde that requires the presence of a hardening agent, e. g., hexamethylenetetramine, during its cure in order to obtain an infusible and insoluble state. These and other objects of our invention will be discussed more fully hereinbelow.

We have found that a resinous composition may be prepared from melamine, phenol and formaldehyde by a process in which the various steps involved are carefully controlled and followed in a definite order. Also, the molar proportion of the reactants is carefully controlled to yield a resinous composition which cures only in the presence of a hardening agent. It has been determined that the order of addition of the reactants during the process of our invention must be carefully controlled in order to obtain a product possessing the desired characteristics. Initially, melamine is dissolved in formaldehyde wherein the pH of the slurry is adjusted to within the order of from about 10 to about 12, preferably from about 10.5 to about 11.5, and the slurry is heated at a temperature from about 75° C. to about 90° C., preferably from about 80° C. to about 87° C., within a period of from about 15 to 30 minutes at which time substantially all of the melamine has been dissolved in the formaldehyde. If the pH of the slurry is not adjusted to within the range specified, resinous compositions prepared do not possess the desired properties due to the insolubility of the melamine in the slurry. Accordingly, in order to obtain complete solubility of the melamine in the formaldehyde and also to insure that the subsequent reaction steps yield a resin of desired characteristics, it is necessary that the initial process step be carefully followed. After the melamine has been dissolved in the formaldehyde, phenol is then introduced into the reaction mixture and the temperature of reaction is raised to the reflux point in a period of from about 15 to 30 minutes and the mixture is then allowed to reflux until the resinous composition formed hydrophobes. In the preparation of the resinous composition the molar ratio of formaldehyde to total mols of melamine and phenol should be within the order of from about 0.5:1 to about 1:1, preferably from about 0.65:1 to about 0.85:1, respectively. The molar ratio of melamine to phenol may vary but it is preferred that the molar ratio of melamine to phenol be within the order of about 1:1, respectively.

After the reaction product has been allowed to reflux until the composition hydrophobes, a suitable molding composition may then be prepared by a method which may be termed either a dry process or a wet process. The preparation of a molding composition by the wet process may be accomplished by removing any excess water present in the resinous syrup by distillation as is well known in the art. A suitable distillation may be carried out at about 63° C. and 200 millimeters of mercury pressure. The excess amount of water that has been removed by distillation is replaced by a water-soluble alcohol, e. g., methanol, ethanol, propanol, isopropanol, butanol, tertiary-butanol and the like. The amount of water removed by distillation is such that a water to water-soluble alcohol ratio of about 60:40, respectively, yields a resinous syrup having resin solids content of from about 60% to about 65%. As is well known, water-soluble alcohols are lower alkyl saturated alcohols containing from one to four carbon atoms. After the resin solids content and the water alcohol ratio have been adjusted, a hardening agent such as hexamethylenetetramine in an amount of from about 7% to about 20% by weight based on the weight of resin solids, preferably from about 7% to about 10% by weight, is dissolved in the syrup. This resinous syrup is then used to impregnate a filler, the filled material dried to a desired volatile content and then comminuted by any means well known to obtain a resinous molding composition.

The resin impregnated filler may be treated in order to obtain the desired volatile content by any desired method. We have found that a suitable method of drying the resin impregnated filler is by means of a continuous dryer maintained at a dry bulb temperature of from about 150° F. to about 200° F. and at a wet bulb temperature of from about 90° F. to about 120° F. The volatile content of the material after drying should be within the order of about 5% by weight or less. Illustrative examples of fillers that may be impregnated with the resinous syrup are such as alpha-cellulose, wood flour, walnut shell flour, asbestos in the form of a powder or short or long fibers finely divided, silicon carbide, carbon black, diatomaceous earth, slate dust, powdered rutile, powdered or flaked mica, powdered quartz, cloth cuttings (e. g. cuttings of silk, rayon, wool, linen, cotton, nylon or of cloth made from glass fibers or from polymeric or copolymeric acrylonitrile fibers, etc.), ground cork, sand and the like. Depending upon the particular filler employed and the intended use of the mold product, the filler may constitute for example up to 80% by weight of the molding composition. It will also be noted that both organic and inorganic fillers may be employed in the process of our invention.

When a molding composition is prepared by the so-called dry process from the reaction mixture after the resin formed has hydrophobed, a dry resinous powder is obtained by any desired method such as vacuum concentration, spray drying, drum drying and the like. The dried resinous material may then be ground to any desired particle size and this material in combination with a filler and a hardening agent such as hexamethylenetetramine may then be homogeneously blended as in a ball mill or by any other suitable means to obtain the resinous molding composition. In the event that the resinous molding composition is prepared by this method, the amount of the filler and the amount of the hardening agent employed will be in the range above specified.

In order that those skilled in the art may more fully understand the inventive concept herein presented, the following example is given by way of illustration and not limitation unless otherwise noted in the appended claims.

*Example*

One mol of melamine and 1.66 mols of formaldehyde (using 37% formalin) were charged to a three-neck flask fitted with a thermometer, stirrer and a reflux condenser. After adjusting solids to 57.5% and the pH to about 11–11.5 by adding sodium hydroxide solution, the charge was heated to approximately 80° C. At this temperature most of the melamine had dissolved. One mol of phenol, previously heated to the reaction temperature, was then charged and the reaction conditions maintained. The mixture soon became homogeneous. Upon further reaction, it separated into two phases. At this point water was removed by distillation under reduced pressure. Enough water was removed and partially replaced with isopropanol to give a resin syrup with the following composition: 65% solids, solvent comprising 60 parts water and 40 parts isopropanol.

52.2 parts of resin were combined with 5.8 parts of hexamethylenetetramine and 40 parts of fir wood flour as follows: hexamethylenetetramine was dissolved into the resin syrup and the resulting solution mixed with fir wood flour in a heated mixer. The material so produced was dried in a humidity-controlled, forced draft oven, allowed to cool and ground in an impact mill. The molding powder was then used in the preparation of test specimens.

The following tabulation presents the properties of this new molding material and moldings made therefrom:

| Strength: | Phenol-melamine compound described above |
|---|---|
| Flexural, p. s. i. | 11,200 |
| Impact, ft. lbs./in. of notch | 0.11 |
| Shrinkage: | |
| C. M. C. P., mils/inch | 6.9 |
| After 48 hrs. at 105° C., mils/inch | 1.9 |
| Hardness, Barcol impressor | 60 |
| Water absorption, 24 hrs. at 25° C., percent | 0.19 |
| Resistance to cracking around inserts | OK |

While the above discussion has been directed specifically to melamine, phenol and formaldehyde, it should be pointed out that the invention is not restricted thereto. For example, other hydroxy aromatic compositons such as cresol, xylenol, ethylphenol, mesitol, resorcinol, catechol and the like may also be used. Aminotriazines other than melamine may also be employed if desired, examples of which are acetoguanamine; benzoguanamine; 2,4-diethyl-6-amino-1,3,5-triazine; 2-hydroxy-4,6-diamino-1,3,5-triazine; and the like. It is also possible to use other aldehydes such as acetaldehyde, butyraldehyde, benzaldehyde, and compounds such as paraformaldehyde which engender formaldehyde in the process of our invention. Obviously, mixtures of the various reactants may be used if desired. In any event, the molar ratio of the compounds employed must fall within the ratio above specified and the process steps must be carefully followed in order to obtain a molding composition that requires the presence of a hardening agent in order to cure to an infusible and insoluble state. Other hardening agents besides hexamethylenetetramine that may be employed in our invention are such as paraformaldehyde and salts of hexamethylenetetramine, e. g. hydrochloride, sulfate, oxalate and the like.

Dyes, pigments and mold lubricants may also be incorporated into the molding composition of our invention if desired. Cure of the molding composition may be accomplished by the application of heat and pressure as is well known in the art.

The resinous compositions of our invention may be employed in applications other than for the preparation of molding compositions. Thus, the resinous syrup obtained having the desired hardening agent dissolved therein may be utilized in the absence of a filler as an adhesive, coating composition or laminating varnish. It is also possible, if desired, to produce a molding composition for certain applications which contains no filler.

We claim:

1. A process for preparing a potentially thermosetting resinous composition which comprises mixing (1) a thermoplastic resinous material prepared by dissolving melamine in formaldehyde at a temperature within the range of from about 75° C. to about 90° C. and at a pH in the order of from about 10 to about 12, adding thereto phenol wherein the molar ratio of formaldehyde to total melamine and phenol is within the order of from about 0.5:1 to about 1:1, respectively, reacting at reflux temperature until the composition hydrophobes, removing excess water from said composition, adding thereto sufficient water-soluble alcohol to give a resinous syrup having water-alcohol ratio in the order of about 60–40, respectively, and a resin solids content in the range of about 60% to about 65%, with (2) from about 7% to about 20% by weight based on the total resins solids of a reactive cross-linking hardening agent, until (2) is substantially dissolved in (1), impregnating a filler with said mixture of (1) and (2), drying said impregnated filler and comminuting said dried resin impregnated filler.

2. A resinous composition of matter curable to an infusible and insoluble state in the presence of a reactive cross-linking hardening agent which comprises the thermoplastic reaction product of melamine, phenol and formaldehyde wherein the molar ratio of formaldehyde to total melamine and phenol is within the order of from about 0.5:1 to about 1:1, respectively.

3. An insoluble and infusible resinous composition which comprises the cured reaction product of (1) a thermoplastic resinous material prepared from melamine, phenol and formaldehyde with (2) from about 7% to about 20% by weight based on the weight of said (1) of a reactive cross-linking hardening agent and wherein the molar ratio of formaldehyde to total melamine and phenol is within the order of from about 0.5:1 to about 1:1, respectively.

4. A process for preparing a potentially thermosetting resinous composition which comprises comminuting and homogeneously blending (1) a thermoplastic resinous material prepared by dissolving melamine in formaldehyde at a temperature within the range of from about 75° C. to about 90° C. and at a pH in the order of from about 10 to about 12, adding thereto phenol wherein the molar ratio of formaldehyde to total melamine and phenol is within the order of from about 0.5:1 to about 1:1, respectively, reacting at reflux temperature until the composition hydrophobes, removing water of condensation to obtain a substantially dry thermoplastic resinous material, (2) a filler and (3) from about 7% to about 20% by weight based on the total weight of said (1) of a reactive cross-linking hardening agent.

5. A process for preparing a potentially thermosetting resinous composition which comprises mixing (1) a thermoplastic resinous material prepared by dissolving melamine in formaldehyde at a temperature within the range of from about 75° C. to about 90° C. and at a pH in the order of from about 10 to about 12, adding thereto phenol wherein the molar ratio formaldehyde to total melamine and phenol is within the order of from about 0.5:1 to about 1:1, respectively, reacting at reflux temperature until the composition hydrophobes, removing excess water from said composition, adding thereto sufficient water-soluble alcohol to give a resinous syrup having water-alcohol ratio in the order of about 60–40, respectively, and a resin solids content in the range of about 60% to about 65%, with (2) from about 7% to about 20% by weight based on the total resins solids of hexamethylenetetramine, until (2) is substantially dissolved in (1), impregnating a filler with said mixture of (1) and (2), drying said impregnated filler and comminuting said dried resin impregnated filler.

6. A resinous composition of matter curable to an infusible and insoluble state in the presence of hexamethylenetetramine which comprises the thermoplastic reaction product of melamine, phenol and formaldehyde wherein the molar ratio of formaldehyde to total melamine and phenol is within the order of from about 0.5:1 to about 1:1, respectively.

7. An insoluble and infusible resinous composition which comprises the cured reaction product of (1) a thermoplastic resinous material prepared from melamine, phenol and formaldehyde with (2) from about 7% to about 20% by weight based on the weight of said (1) of hexamethylenetetramine and wherein the molar ratio of formaldehyde to total melamine and phenol is within the order of from about 0.5:1 to about 1:1, respectively.

8. A process for preparing a potentially thermosetting resinous composition which comprises comminuting and homogeneously blending (1) a thermoplastic resinous material prepared by dissolving melamine in formaldehyde at a temperature within the range of from about 75° C. to about 90° C. and at a pH in the order of from about 10 to about 12, adding thereto phenol wherein the molar ratio of formaldehyde to total melamine and phenol is within the order of from about 0.5:1 to about 1:1, respectively, reacting at reflux temperature until the composition hydrophobes, removing water of condensation to obtain a substantially dry thermoplastic resinous material, (2) a filler and (3) from about 7% to about 20% by weight based on the total weight of said (1) of hexamethylenetetramine.

9. A process for preparing a potentially thermosetting resinous composition which comprises mixing (1) a thermoplastic resinous material prepared by dissolving melamine in formaldehyde at a temperature within the range of from about 80° C. to about 87° C. and at a pH in the order of from about 10.5 to about 11.5, adding thereto phenol wherein the molar ratio of formaldehyde to total melamine and phenol is within the order of from about 0.65:1 to about 0.85:1, respectively, reacting at reflux temperature until the composition hydrophobes, removing excess water from said composition, adding thereto sufficient isopropyl alcohol to give a resinous syrup having water-alcohol ratio in the order of about 60–40, respectively, and a resin solids content in the range of about 60% to about 65%, with (2) from about 7% to about 10% by weight based on the total resins solids of hexamethylenetetramine, until (2) is substantially dissolved in (1), impregnating a filler with said mixture of (1) and (2), drying said impregnated filler and comminuting said dried resin impregnated filler.

10. An insoluble and infusible resinous composition which comprises the cured reaction product of (1) a thermoplastic resinous material prepared from melamine, phenol and formaldehyde with (2) from about 7% to about 10% by weight based on the weight of said (1) of hexamethylenetetramine and wherein the molar ratio of formaldehyde to total melamine and phenol is within the order of from about 0.65:1 to about 0.85:1, respectively.

11. A process for preparing a potentially thermosetting resinous composition which comprises comminuting and homogeneously blending (1) a thermoplastic resinous material prepared by dissolving melamine in formaldehyde at a temperature within the range of from about 80° C. to about 87° C. and at a pH in the order of from about 10.5 to about 11.5, adding thereto phenol wherein the molar ratio of formaldehyde to total melamine and phenol is within the order of from about 0.65:1 to about 0.85:1, respectively, reacting at reflux temperature until the composition hydrophobes, removing water of condensation to obtain a substantially dry thermoplastic resinous material, (2) a filler and (3) from about 7% to about 10% by weight based on the total weight of said (1) of hexamethylenetetramine.

References Cited in the file of this patent
UNITED STATES PATENTS

| | | |
|---|---|---|
| 2,565,538 | Welch et al. | Aug. 28, 1951 |

FOREIGN PATENTS

| | | |
|---|---|---|
| 562,304 | Great Britain | June 27, 1944 |